United States Patent
Sommerhalter, Jr. et al.

(10) Patent No.: US 7,287,638 B1
(45) Date of Patent: Oct. 30, 2007

(54) APPARATUS, METHOD OF MANUFACTURING AND METHOD OF USING A LINEAR ACTUATOR

(75) Inventors: Frederick A. Sommerhalter, Jr., Oyster Bay, NY (US); Nandakumar Thirunarayan, Saint James, NY (US)

(73) Assignee: Anorad Corporation, Shirley, NY (US)

( * ) Notice: Subject to any disclaimer, the term of this patent is extended or adjusted under 35 U.S.C. 154(b) by 0 days.

(21) Appl. No.: 11/384,688

(22) Filed: Mar. 20, 2006

Related U.S. Application Data (63) Continuation of application No. 10/041,420, filed on Jan. 8, 2002, now Pat. No. 7,040,481.

(51) Int. Cl.
*H02K 41/00* (2006.01)

(52) U.S. Cl. .................. 198/619; 310/12; 104/290; 104/294

(58) Field of Classification Search ........... 198/619; 310/12–14; 104/290, 292, 294
See application file for complete search history.

(56) References Cited

U.S. PATENT DOCUMENTS

| | | | |
|---|---|---|---|
| 4,788,898 A * | 12/1988 | Bull | 87/57 |
| 5,705,902 A | 1/1998 | Merritt et al. | |
| 5,821,841 A | 10/1998 | Furlani et al. | |
| 5,939,804 A | 8/1999 | Nakao et al. | |
| 5,952,744 A | 9/1999 | Chitayat | |
| 5,982,053 A | 11/1999 | Chitayat | |
| 6,013,959 A | 1/2000 | Hoppie | |
| 6,118,360 A | 9/2000 | Neff | |
| 6,137,195 A | 10/2000 | Chitayat | |
| 6,198,179 B1 | 3/2001 | Fukunaga et al. | |
| 6,215,206 B1 | 4/2001 | Chitayat | |
| 6,274,952 B1 | 8/2001 | Chitayat | |
| 6,429,611 B1 | 8/2002 | Li | |
| 6,800,966 B2 * | 10/2004 | Godkin | 310/12 |
| 7,040,481 B1 * | 5/2006 | Sommerhalter et al. | 198/619 |

* cited by examiner

*Primary Examiner*—Mark A Deuble
(74) *Attorney, Agent, or Firm*—Amin Turocy & Calvin LLP; Alexander R. Kuszewski (57) ABSTRACT

A linear actuator, method manufacturing and method of using the linear actuator are provided. The invention includes a linear actuator having a plurality of annular magnets surrounded by a bobbin assembly having a coil system. The plurality of annular magnets can be arranged with alternating polarity. The bobbin assembly can be movable along a longitudinal axis extending through the plurality of annular magnets and can further comprise a coil system having coils arranged to, when energized, interact with at least one of the plurality of annular magnets to move the bobbin in a linear mode. Thus, by selectively energizing one or more of the coils, a motive force can be generated on the bobbin assembly by interacting with fields generated by the plurality of annular magnets.

17 Claims, 10 Drawing Sheets

APPARATUS, METHOD OF MANUFACTURING AND METHOD OF USING A LINEAR ACTUATOR

CROSS-REFERENCE TO RELATED APPLICATIONS

This application is a continuation application of U.S. patent application Ser. No. 10/041,420, filed Jan. 8, 2002 now U.S. Pat. No. 7,040,481, entitled "APPARATUS, METHOD OF MANUFACTURING AND METHOD OF USING A LINEAR ACTUATOR", the entire contents of which are herein incorporated by reference.

TECHNICAL FIELD

The present invention relates to the art of linear actuators and more particularly to an apparatus, methods of manufacturing and methods of using a linear actuator.

BACKGROUND OF THE INVENTION

Linear actuators are used in a variety of industrial and manufacturing settings (e.g., pick and place applications in semiconductor industry, glue dispensing and printed circuit board assembly industry) to provide precise, repeatable action(s). There is a need in the field for linear actuators that provide high accuracy, low weight, large load-carrying capacity, compact size, smooth operation and cost-effectiveness.

SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. Its sole purpose is to present some concepts of the invention in a simplified form as a prelude to the more detailed description that is presented later.

The present invention relates to a system and method for a linear actuator having a plurality of annular magnets and a bobbin assembly generally surrounding the plurality of annular magnets. The plurality of annular magnets can be mounted on a core (e.g., rod) coupled to first and second ends. The plurality of annular magnets can be arranged with alternating polarity—substantially half of the annular magnets oriented so that their north poles point radially outward and a substantially equal number oriented so that their north poles point radially inward.

The bobbin assembly can be movable along a longitudinal axis extending through the plurality of annular magnets and can further comprise a coil system having coils arranged to, when energized, interact with at least one of the plurality of annular magnets to move the bobbin in a linear mode. Thus, by selectively energizing one or more of the coils, a motive force can be generated on the bobbin assembly by interacting with fields generated by the plurality of annular magnets.

According to an aspect of the present invention, one or more of the annular magnets can comprise a plurality of component magnets. Additionally, the plurality of magnets can include radial polarity annular magnet(s) and longitudinal polarity annular magnet(s). The radial polarity annular magnet(s) can be positioned adjacent to the longitudinal polarity annular magnet(s) in an appropriate manner to effect movement of a bobbin assembly.

Another aspect of the present invention provides for the linear actuator to include an encoder scale and an optical pickup operative to sense a position of the bobbin assembly (e.g., absolute and/or relative) and provide a sensor signal indicative of the position of the linear actuator.

Yet another aspect of the present invention provides for methods for manufacturing a linear actuator having annular magnets and methods of using a linear actuator having annular magnets.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

The present invention is now described with reference to the drawings, wherein like reference numerals are used to refer to like elements throughout. In the following description, for purposes of explanation, numerous specific details are set forth in order to provide a thorough understanding of the present invention. It may be evident to one skilled in the art that the present invention may be practiced without these specific details. In other instances, well-known structures and devices are shown in block diagram form in order to facilitate description of the present invention.

Figure 1:
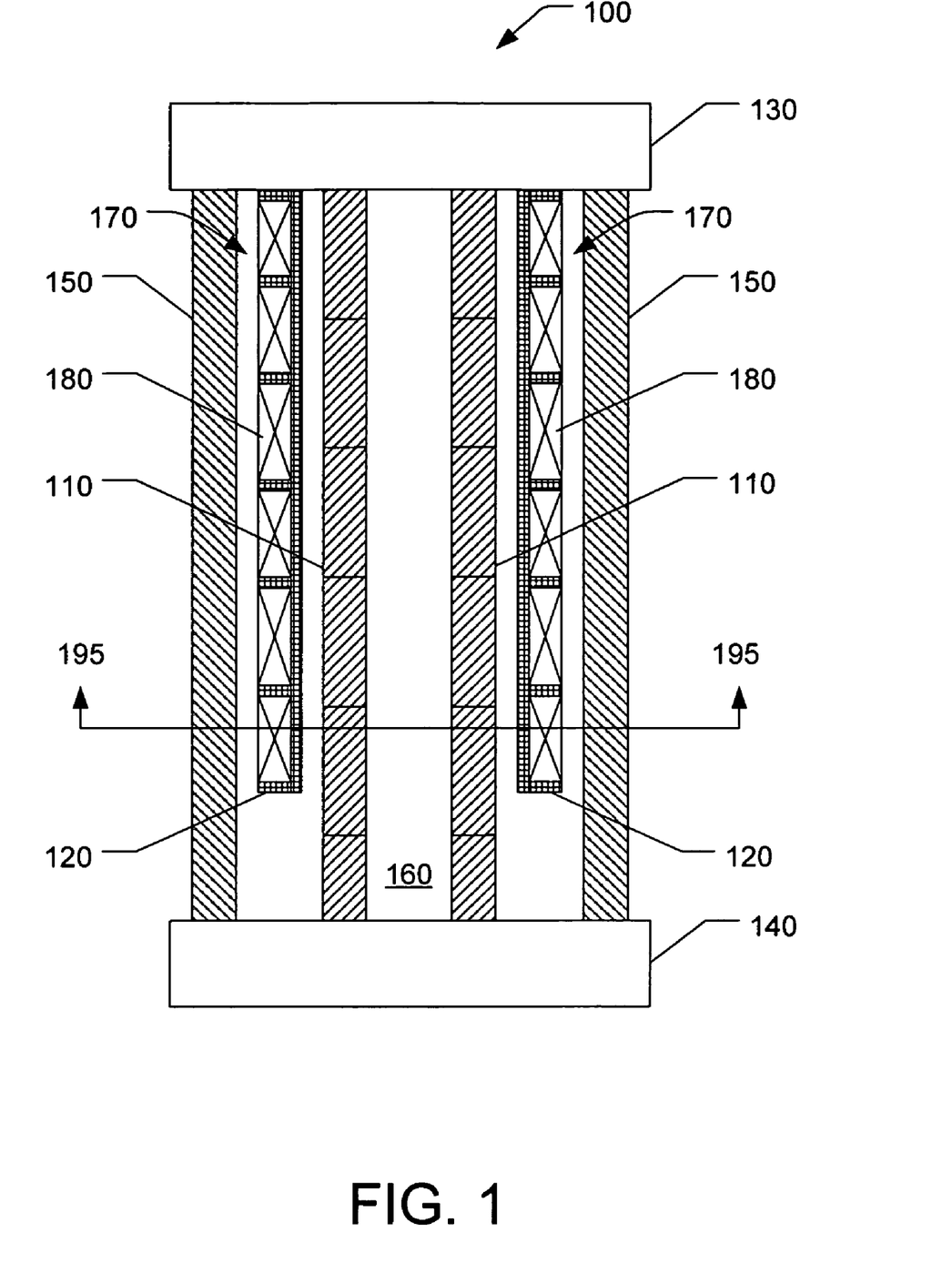
FIG. 1 is a cross-section of a linear actuator in accordance with an aspect of the present invention in which a bobbin assembly is shown a first position.

Referring to FIG. 1, a cross-section of a linear actuator 100 in accordance with an aspect of the present invention is illustrated. The linear actuator 100 includes a plurality of annular magnets 110, a bobbin assembly 120, a first end 130, a second end 140 and a housing 150.

The plurality of annular magnets 110 can be arranged surrounding a rod 160. For example, the plurality of annular magnets 110 can arranged with alternating polarity—substantially half of the annular magnets 110 oriented so that their north poles point radially outward and a substantially equal number oriented so that their north poles point radially inward. One or more of the plurality of annular magnets 110 can be disposed conformally about the rod 160. Further, one or more of the plurality of annular magnets 110 can have an inner portion at least partially disposed conformally about the rod 160.

The rod 160 can be coupled to the first end 130 and second end 140. Further, the rod 160 can comprise electrically conductive material, for example, steel. While the rod 160 is depicted as having a circular cross-section, it is to be appreciated that in accordance with the present invention, any suitable geometry can be employed.

Figure 2:
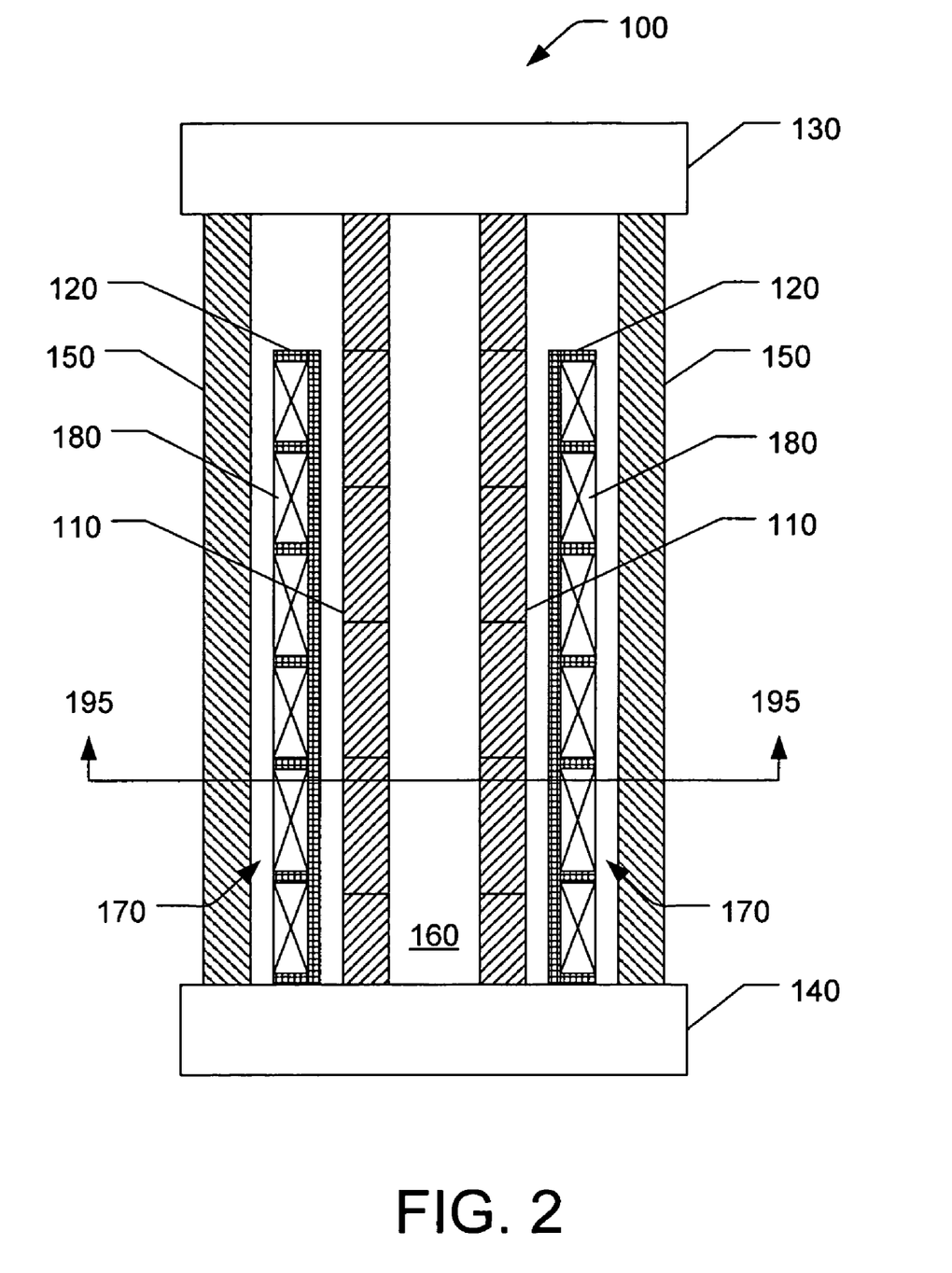
FIG. 2 is a cross-section of the linear actuator of FIG. 1 in which the bobbin assembly is shown in a second position.

The bobbin assembly 120 can be positioned to generally surround the plurality of annular magnets 110. Further, the bobbin assembly 120 can be movable along a longitudinal axis extending through the plurality of annular magnets 110. For example, the bobbin assembly 120 can comprise magnetic material(s) (e.g., iron) and/or nonmagnetic material(s) (e.g., aluminum). The use of magnetic material(s) can result in increased detent force(s) that may be undesirable in certain applications. The use of nonmagnetic material(s) can result in reduced detent force(s) leading to smoother operation. The bobbin assembly 120 can further comprise a coil system 170 having coil(s) 180 arranged to, when energized, interact with at least one of the plurality of annular magnets 110 to move the bobbin 120 in a linear mode. By selectively energizing one or more of the coil(s) 180, a motive force can be generated on the bobbin assembly 120 by interacting with fields generated by the plurality of annular magnets 110. FIG. 1 illustrates the bobbin assembly 120 in a first position and FIG. 2 illustrates the bobbin assembly 120 in a second position. The linear actuator 100 can be used as part of a linear motion (e.g., for production assembly).

The coil system 170 can comprise one or more coil(s) 180; the density and size chosen based on the application. The coil(s) 180 can be manufactured by winding wire directly into slots in the bobbin assembly 120. This maximizes the amount of conductors and slot fill and provides close contact of conductors to the bobbin assembly 120 (e.g., for efficient thermal transfer). Voids can be filled with epoxy.

Alternatively, the coil(s) 180 can be manufactured by winding the coil(s) 180 in a standard manner (e.g., using copper wire surrounded by a heat-actuated glue). For example, a current can be applied to the coil(s) 180 and the coil(s) 180 bent in a jig or mold to the proper shape. After the coil(s) 180 cool, they retain their curved shape. The coil(s) 180 can then be inserted in slots in the bobbin assembly 120 and varnish or epoxy applied to the coil(s) 180. Voids can be filled with epoxy.

Figure 3:
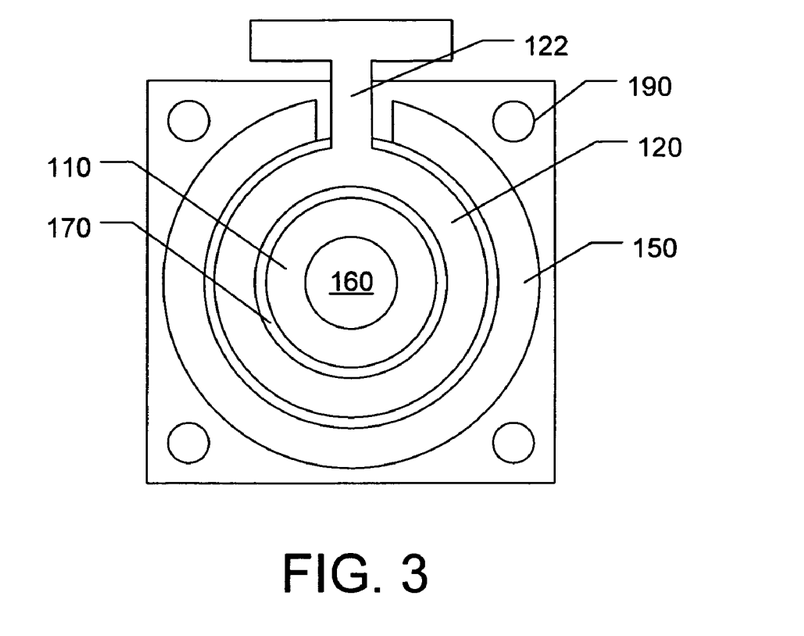
FIG. 3 is a cross-section taken along line 195-195 of the linear actuator of FIG. 1 and FIG. 2.

Referring next to FIG. 3, a cross-section taken along line 195-195 of the linear actuator 100 of FIG. 1 and FIG. 2 is illustrated. The linear actuator 100 includes the rod 160 substantially surrounded by the plurality of annular magnets 110. The plurality of annular magnets 110 are likewise substantially surrounded by the bobbin assembly 120 comprising the coil system 170. The housing 150 generally surrounds the bobbin assembly 120—for example, allowing an appropriate clearance for a stage portion 122 of the bobbin assembly 120. Optionally, the first end 130 (not shown) and the second end 140 (not shown) can be coupled via one or more stabilizing rod(s) 190.

Figure 4:
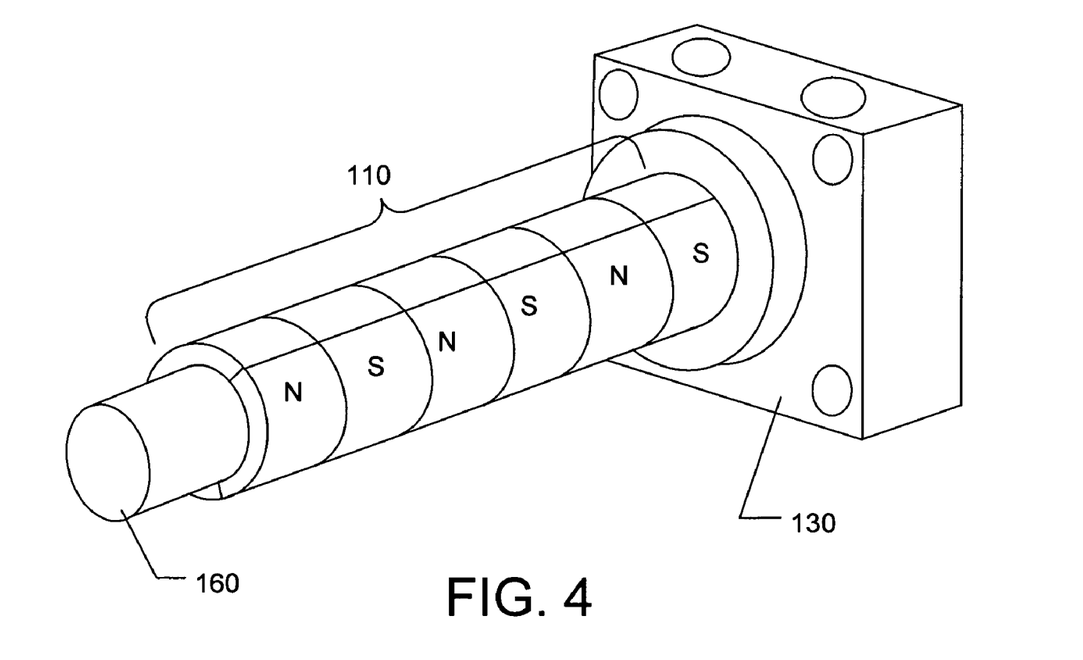
FIG. 4 is a view of the linear actuator of FIG. 1 and FIG. 2 in a preliminary stage of manufacture showing magnets arranged about a rod element.
Figure 5:
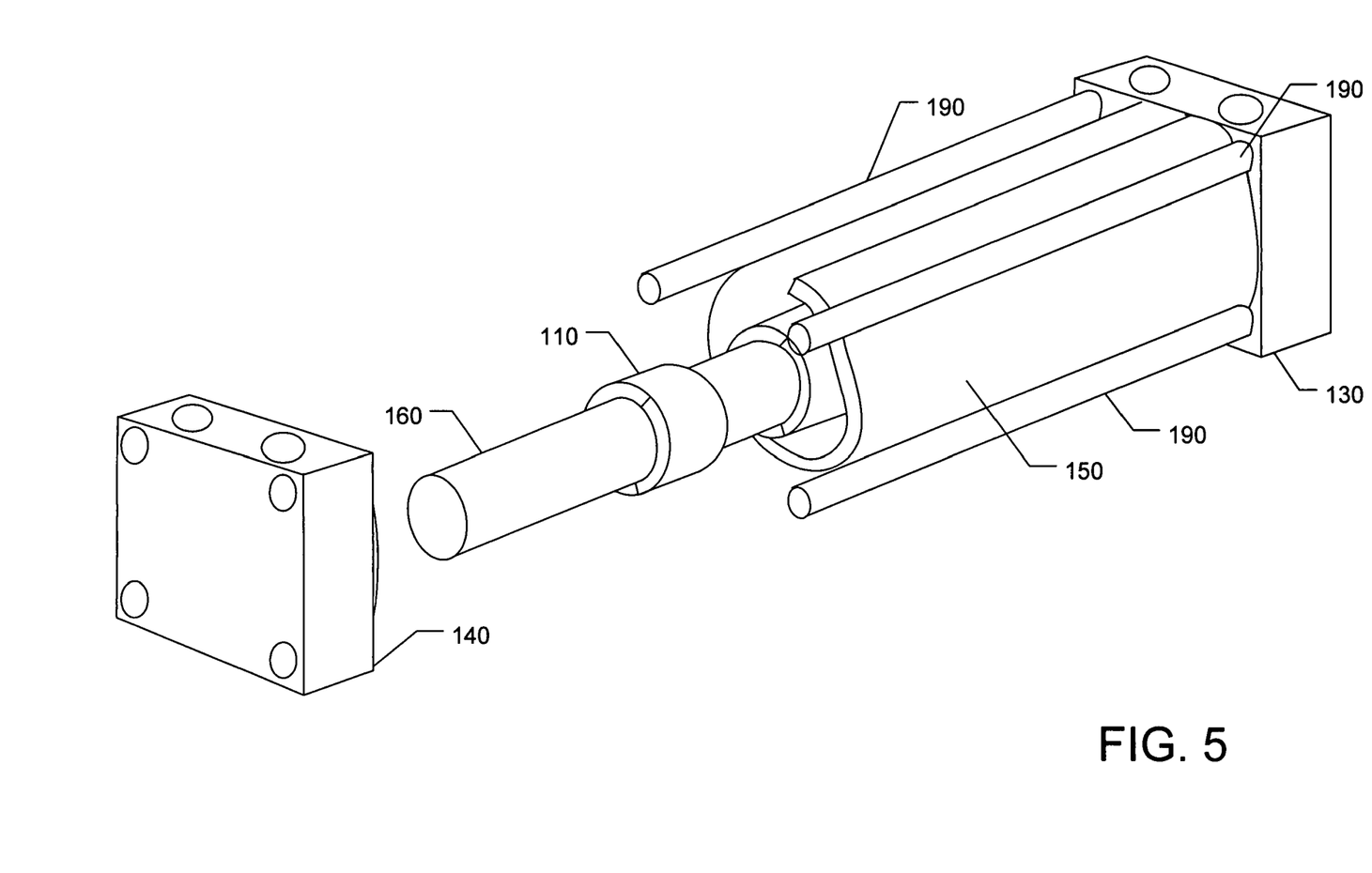
FIG. 5 is a view of the linear actuator of FIG. 4 in a further state of manufacture.
Figure 6:
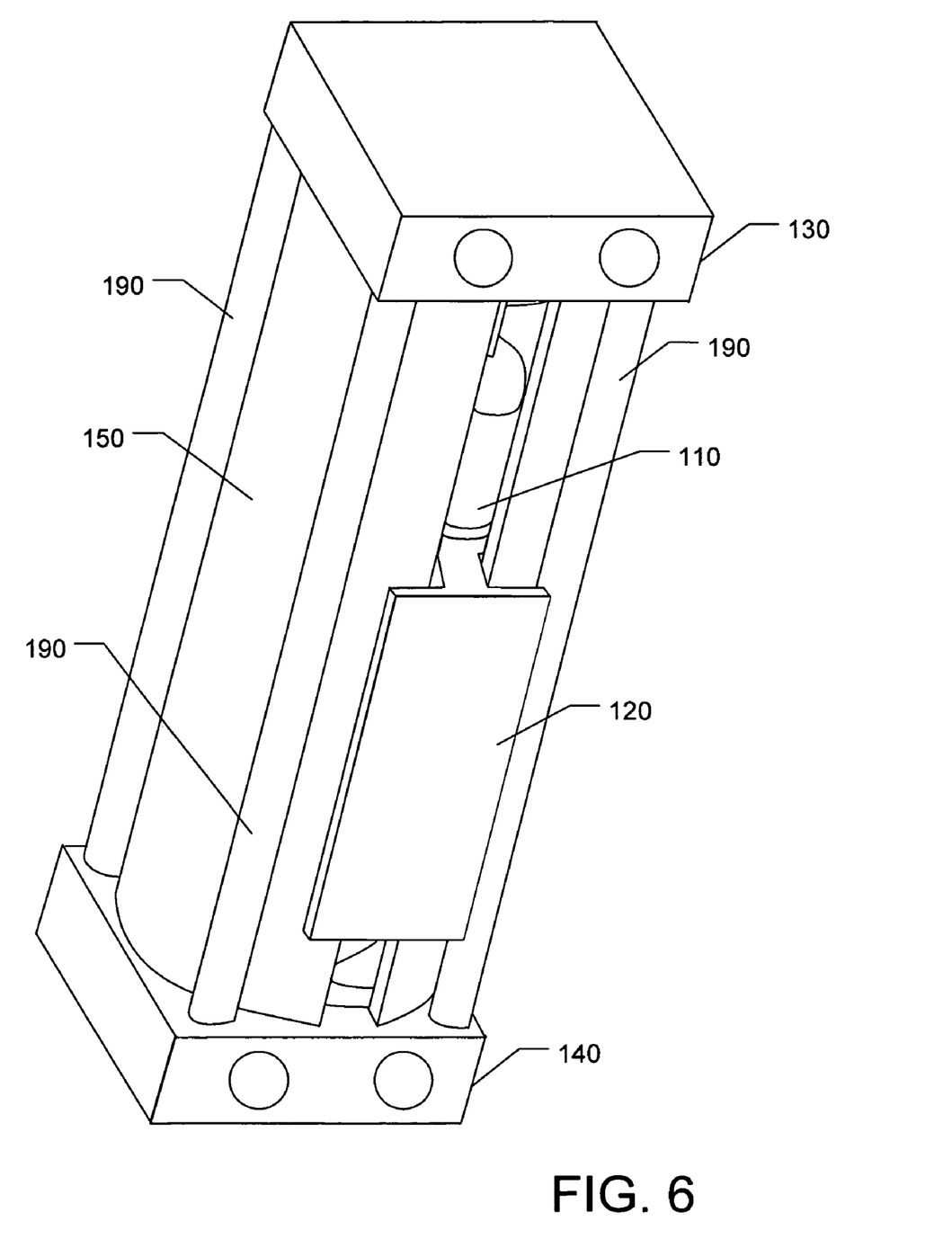
FIG. 6 is a view of the linear actuator of FIG. 4 and FIG. 5 in yet a further state of manufacture.

Turning to FIGS. 4 through 6, the linear actuator 100 of FIG. 1 and FIG. 2 is illustrated in various states of manufacture. It is to be appreciated that the states of manufacture depicted in FIGS. 4 through 6 are merely descriptive of one manner of manufacturing the linear actuator 100. The linear actuator of the present invention can be manufactured in a variety of ways in accordance with the present invention.

Referring to FIG. 4, a view of the linear actuator 100 in a preliminary stage of manufacture showing the plurality of magnets 110 arranged about the rod 160 is illustrated. While six annular magnets 110 are depicted in FIG. 4, it is to be appreciated that any suitable arrangement of annular magnet (s) is encompassed by the present invention. Further, description of polarity of the plurality of magnets 110 in FIG. 4 is shown for purposes of illustration only; any suitable arrangement of polarity can utilized in accordance with the present invention. The rod 160 is affixed in a suitable manner to the first end 130.

Next, turning to FIG. 5, a view of the linear actuator 100 of FIG. 4 in a further state of manufacture is illustrated. The housing 150 generally surrounding the rod 160 and the plurality of annular magnets 110 has been added. Additionally, optionally stabilizing rod(s) 190 have been coupled to the first end 130. The second end 140 is shown but not yet coupled to the rod 160 or the stabilizing rod(s) 190.

Referring to FIG. 6, a view of the linear actuator 100 of FIG. 4 and FIG. 5 in yet a further state of manufacture is illustrated. The bobbin assembly 120 has been inserted to surround the rod 160 and the plurality of annular magnets 110. The rod 160 has been coupled to the second end 140 as have the optional stabilizing rod(s) 190.

Figure 7:
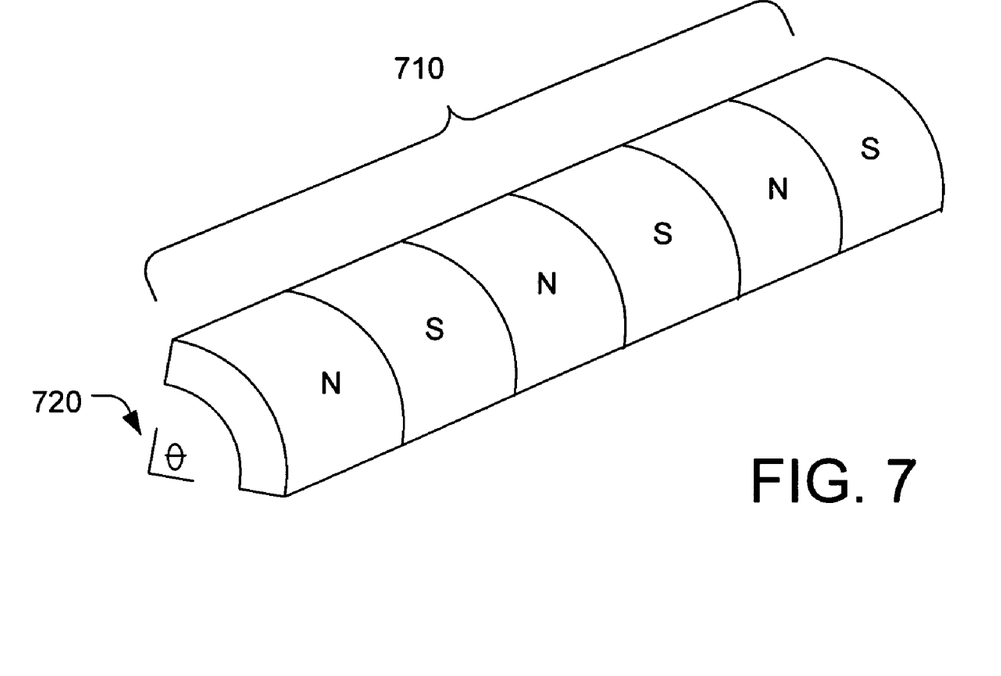
FIG. 7 is a view of an arrangement of magnets in accordance with an aspect of the present invention.

Turning to FIG. 7, a view of an arrangement of a plurality of magnets 710 in accordance with an aspect of the present invention is illustrated. Each of the plurality of magnets 710 has an arc angle θ 720. The arc angle θ 720 can be in the range of about 45 degrees to about 360 degrees.

For example, in the instance where θ 720 is about 120 degrees, three magnets 710 would surround a rod in order to form a substantially complete ring. Alternatively, in the instance where θ 720 is about 180 degrees, two magnets 720 can be utilized. In another example, the magnets forming a substantially complete ring are substantially equal, while in yet another example, the magnets forming a substantially complete ring are not equal (e.g., 240 degrees and 120 degrees). These examples are for illustration only—it is to be appreciated that any suitable arrangement of magnets (e.g., surrounding a rod) is encompassed by the present invention. Further, in accordance with another aspect of the present invention, the magnets do not need to form a substantially complete ring about the rod.

Figure 7A:
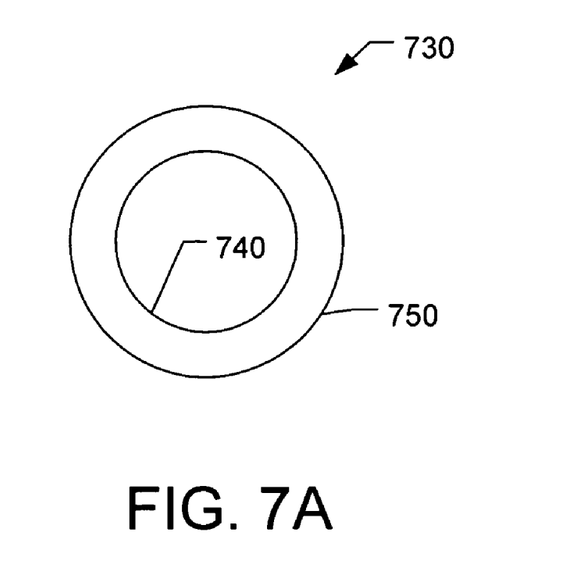
FIG. 7a is a view of an exemplary magnet in accordance with an aspect of the present invention.

Turning briefly to FIG. 7a, a view of an exemplary annular magnet 730 in accordance with an aspect of the present invention is illustrated. The annular magnet 730 is a single piece, the inner surface 740 of which forms an opening (e.g., to surround a rod). While the inner surface 740 is depicted as circular, it is to be appreciated that any suitable inner surface 740 is encompassed by the present invention. For example, the inner surface 740 can be square in order to be placed fixably around a rod. Additionally, an outer surface 750 of the annular magnet 730 can be smooth and/or another suitable geometry (e.g., "bread loaf" shape in order to optimize magnetic flux effect(s)).

Figure 8:
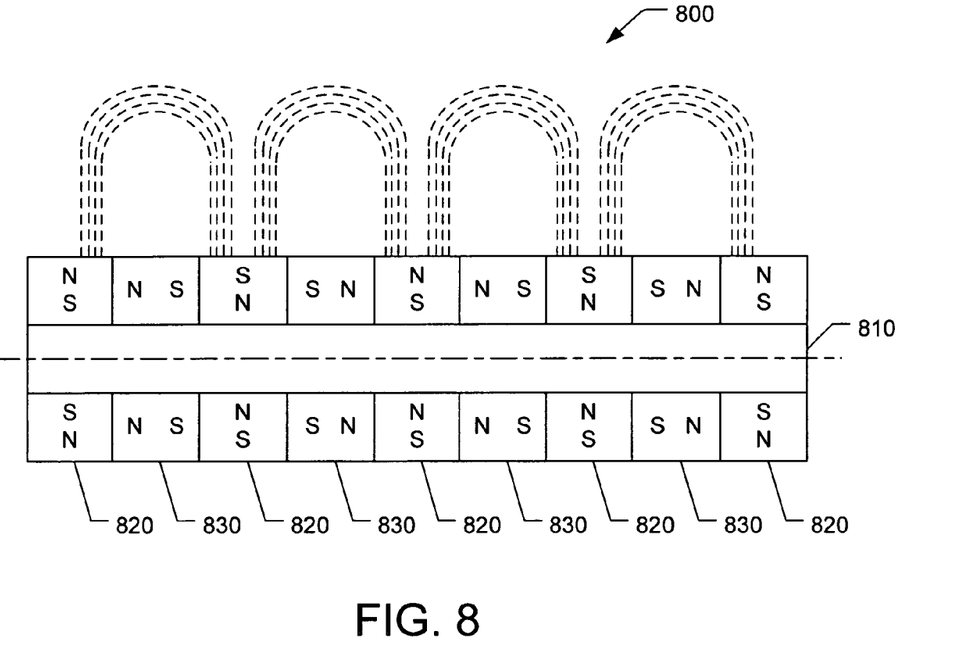
FIG. 8 is cross section view of another arrangement of magnets of a linear actuator in accordance with an aspect of the present invention.

Referring next to FIG. 8, a cross section view of another arrangement of magnets of a linear actuator in accordance with an aspect of the present invention is illustrated. The arrangement 800 includes radial polarity annular magnet(s) 820 and longitudinal polarity annular magnet(s) 830. The radial polarity annular magnet(s) 820 can be positioned adjacent to the longitudinal polarity annular magnet(s) 830 in an appropriate manner to effect movement of bobbin assembly (not shown). An advantage of this arrangement includes the potential elimination of the housing 150 (e.g., outer steel shell).

Figure 9:
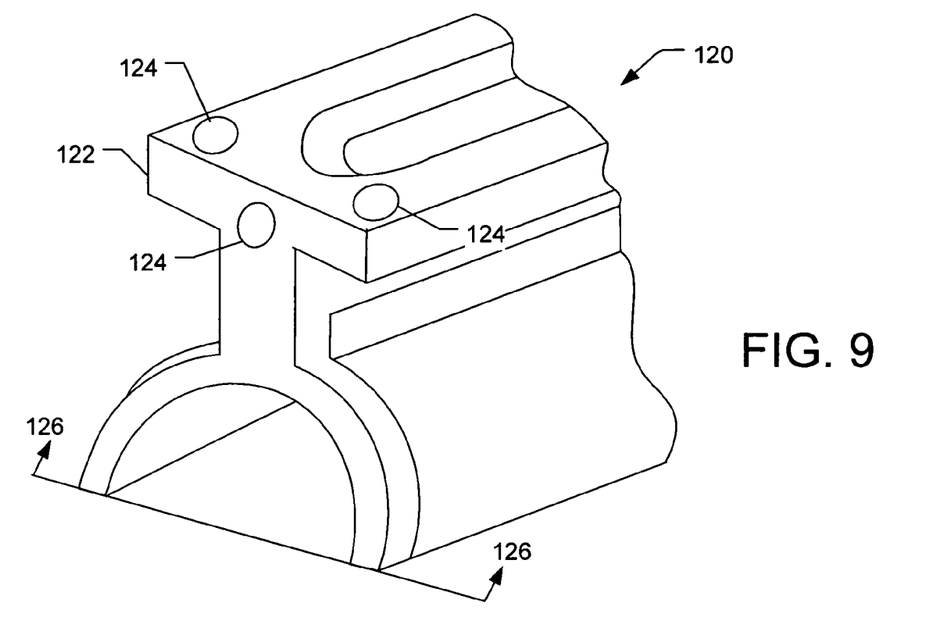
FIG. 9 is view of a bobbin assembly in accordance with an aspect of the present invention.

Referring next to FIG. 9, a view of the bobbin assembly 120 in accordance with an aspect of the present invention is illustrated. The bobbin assembly 120 can include a stage 122 (e.g., for performing work). The stage 122 can include one or a plurality of hole(s) 124 for attaching the bobbin assembly 120 to other system(s) (not shown).

Figure 10:
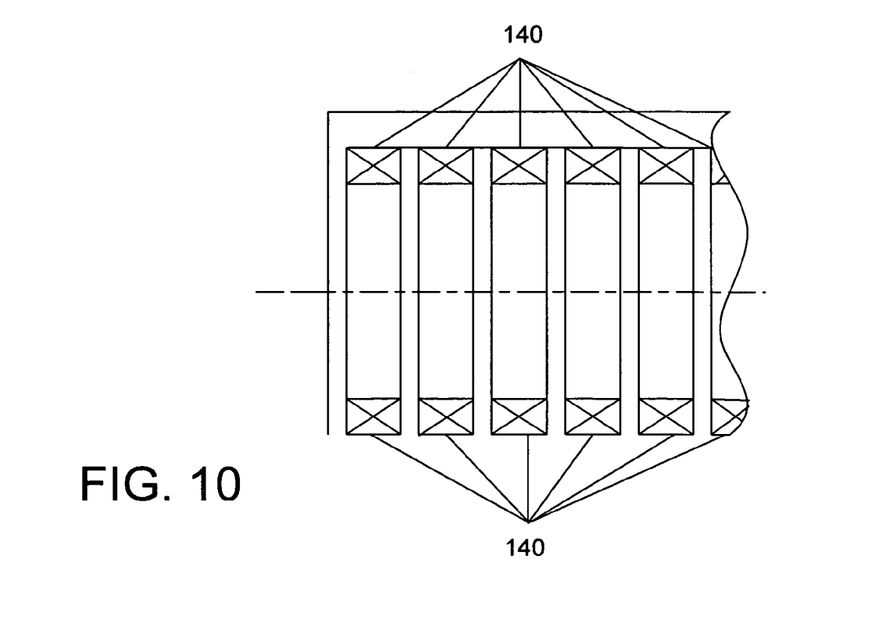
FIG. 10 is a cross-section view taken along line 126-126 of the bobbin assembly of FIG. 9.
Figure 11:
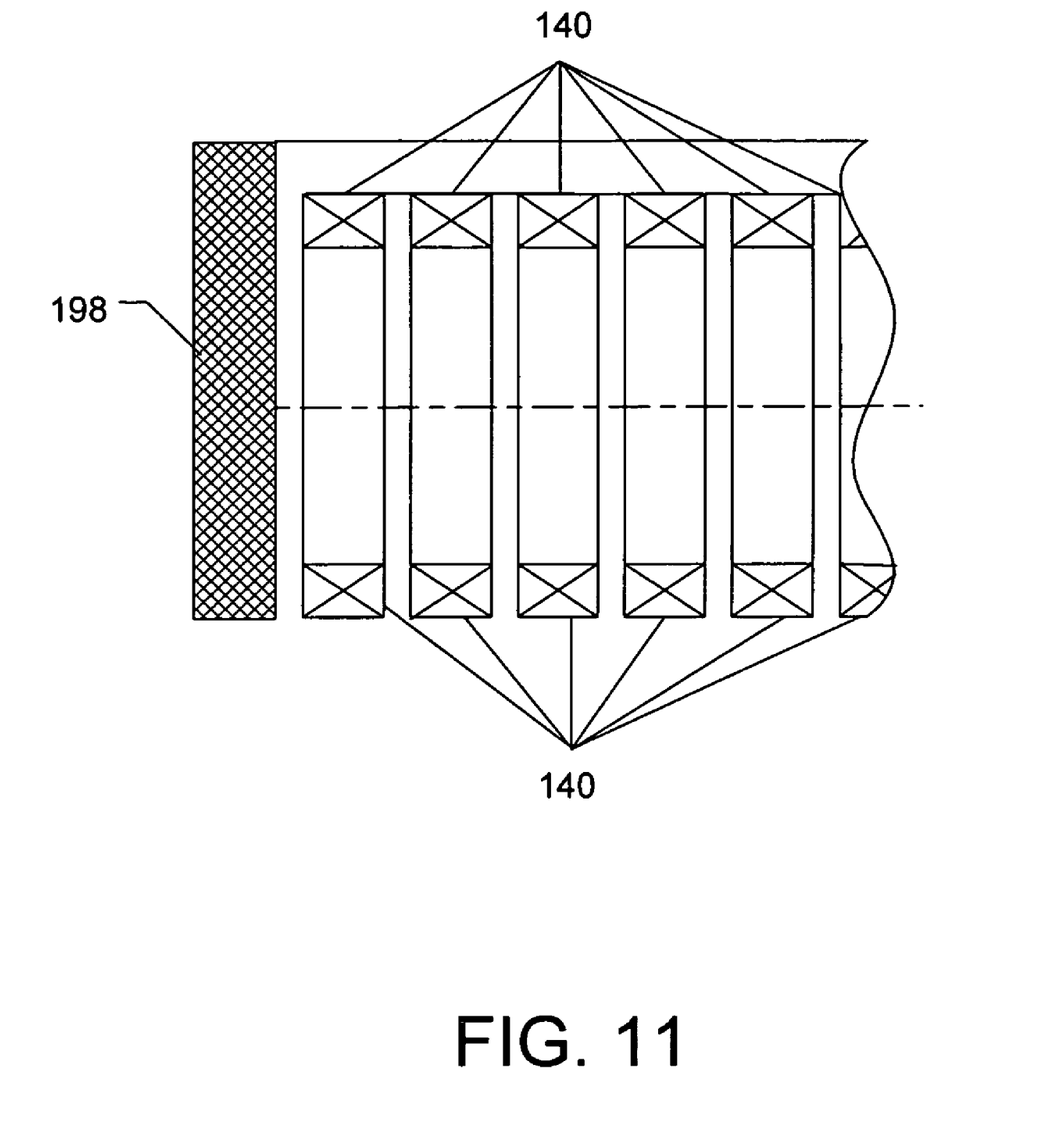
FIG. 11 is a cross-section view taken along line 126-126 of a bobbin assembly having an encoder scale.

Turning to FIG. 10, a cross-section view taken along line 195-195 of the bobbin assembly 120 of FIG. 9 is illustrated. The bobbin assembly 120 includes coil(s) 180 (e.g., bonded in place). As depicted in FIG. 11, the bobbin assembly 120 can further include an optical pickup 198.

Figure 12:
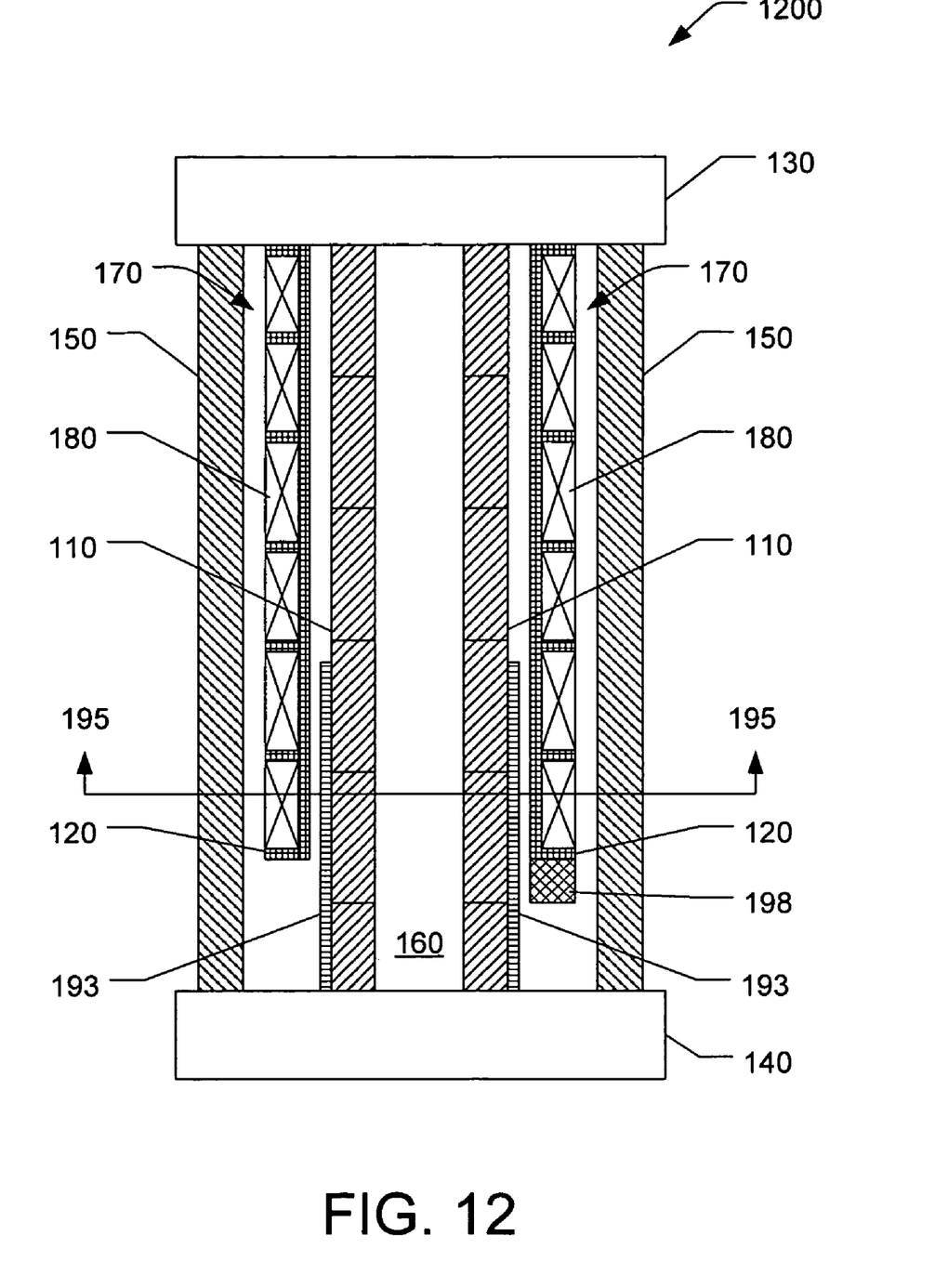
FIG. 12 is a cross-section of a linear actuator in accordance with an aspect of the present invention in which a bobbin assembly has an encoder scale and optical pickup.

Referring next to FIG. 12, a cross-section of a linear actuator 1200 in accordance with an aspect of the present invention in which a bobbin assembly 120 has an optical pickup 198. An encoder scale 193 can be placed over at least a portion of some of the annular magnets 110. The encoder scale 193 can be etched with a pattern of reflective and non-reflective region(s) that are scanned by an optical pickup 198 to register movement of the bobbin assembly 120. The optical pickup 198 can sense a position of the linear actuator (e.g., absolute and/or relative) and provide a sensor signal indicative of the position of the linear actuator (e.g., to a control system (not shown)).

Although the invention has been shown and described with respect to certain illustrated aspects, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes", "including", "has", "having", and variants thereof are used in either the detailed description or the claims, these terms are intended to be inclusive in a manner similar to the term "comprising."

What is claimed is:

1. A linear actuator system, comprising:
    a housing that surrounds a moveable member that encompasses a plurality of annular magnets, at least one of the annular magnets comprises a plurality of magnets wherein each of the plurality of magnets that make up the annular magnet have arc angle less than 360 degrees, the plurality of annular magnets further comprise one or more radial polarity annular magnets and one or more longitudinal polarity annular magnets wherein the one or more radial polarity annular magnets are positioned adjacent to the one or more longitudinal polarity annular magnets in manner to effect movement of the moveable member; and
    at least three support members disposed at disparate locations between two ends of the linear actuator, the at least three support members surround the housing.

2. The system of claim 1, the two ends of the linear actuator coupled by the at least first and second support members.

3. The system of claim 1, the moveable member extends between the two ends of the linear actuator.

4. The system of claim 1, further comprising the moveable member energized by the interaction between the plurality of magnets and one or more coils disposed within the housing.

5. The system of claim 4, the one or more coils selectively energized based on a desired motive force of the moveable member.

6. The system of claim 1, further comprising the plurality of annular magnets arranged to surround an inner rod and to allow both ends of the inner rod to each attach to one of the two ends of the linear actuator.

7. The system of claim 1, the plurality of annular magnets curved to conform to the inner rod.

8. The system of claim 1, further comprising a stage associated with the moveable member, the stage facilitates attachment to at least one auxiliary system.

9. The system of claim 8, further comprising a plurality of openings in the stage.

10. The system of claim 1, an optical pickup and an encoder scale are employed to sense a position of the moveable member.

11. A linear actuator system, comprising:
    a housing that encompasses a plurality of curved annular magnets wherein, at least one of the plurality of curved annular magnets further comprises at least two parts wherein each part is a curved magnet having an arc angle less than 360 degrees, the plurality of annular magnets further comprise one or more radial polarity annular magnets and one or more longitudinal polarity annular magnets wherein the one or more radial polarity annular magnets are positioned adjacent to the one or more longitudinal polarity annular magnets in manner to effect movement of the moveable member; and
    three or more support members disposed about an outside surface of the housing.

12. The system of claim 11, the plurality of curved magnets conforms to an inner rod.

13. The system of claim 11, further comprising a moveable member that surrounds the plurality of annular magnets.

14. The system of claim 13, the housing surrounds the moveable member.

15. The system of claim 11, the housing comprising an opening that extends a length of the housing.

16. The system of claim 15, a portion of the moveable member extends through the opening in the housing.

17. The system of claim 16, the portion of the moveable member further comprising at least two openings to facilitate attachment of at least one auxiliary system.

* * * * *